No. 622,452. Patented Apr. 4, 1899.
F. H. DONALDSON.
MAGNETO ELECTRIC MOTOR DYNAMO.
(Application filed Apr. 16, 1898.)
(No Model.)

Attest:
Philip F. Larner.
Noble D. Larner.

Inventor:
Fred H. Donaldson,
By Howell Barth
Attorney.

THE NORRIS PETERS CO., PHOTO-LITHO., WASHINGTON, D. C.

UNITED STATES PATENT OFFICE.

FRED H. DONALDSON, OF GARVANZA, CALIFORNIA, ASSIGNOR OF TWO-THIRDS TO CHARLES C. McLEAN, OF PHILADELPHIA, PENNSYLVANIA, AND HENRY E. NEWTON, OF LOS ANGELES, CALIFORNIA.

MAGNETO-ELECTRIC MOTOR-DYNAMO.

SPECIFICATION forming part of Letters Patent No. 622,452, dated April 4, 1899.

Application filed April 16, 1898. Serial No. 677,865. (No model.)

*To all whom it may concern:*

Be it known that I, FRED H. DONALDSON, a citizen of the United States, residing at Garvanza, in the county of Los Angeles and State of California, have invented new and useful Improvements in Magneto-Electric Motor-Dynamos, of which the following is a specification.

My invention relates to improvements in electric motors or dynamos wherein permanent steel magnets are used for the field, and machines embodying my invention may properly be termed "magneto-electric motor-dynamos." The chief objects sought by me are the production of a machine simple and economical in construction, of high efficiency, and possessing simple means for regulating the speed, power, and consumption of current.

My invention consists of a series of permanent magnets of the horseshoe type suitably arranged and supported parallel to each other and at substantially equal distances apart, forming what is commonly known as the "field," and an armature consisting of a series of electromagnets mounted upon diametrically opposite sides of a shaft which is rotatively mounted between the poles of the field-magnets, the electromagnets being so spaced as to occupy the spaces between the field-magnets, the whole being combined with a novel make-and-break device for controlling the supply of current to the magnets of the armature, a commutator in circuit with the coils of the armature, and a condenser for controlling and utilizing the induced current, all as will be hereinafter more particularly described.

After a detail description of a machine embodying my invention the features deemed novel will be duly specified in the several clauses of claim hereunto annexed.

Figure 1:
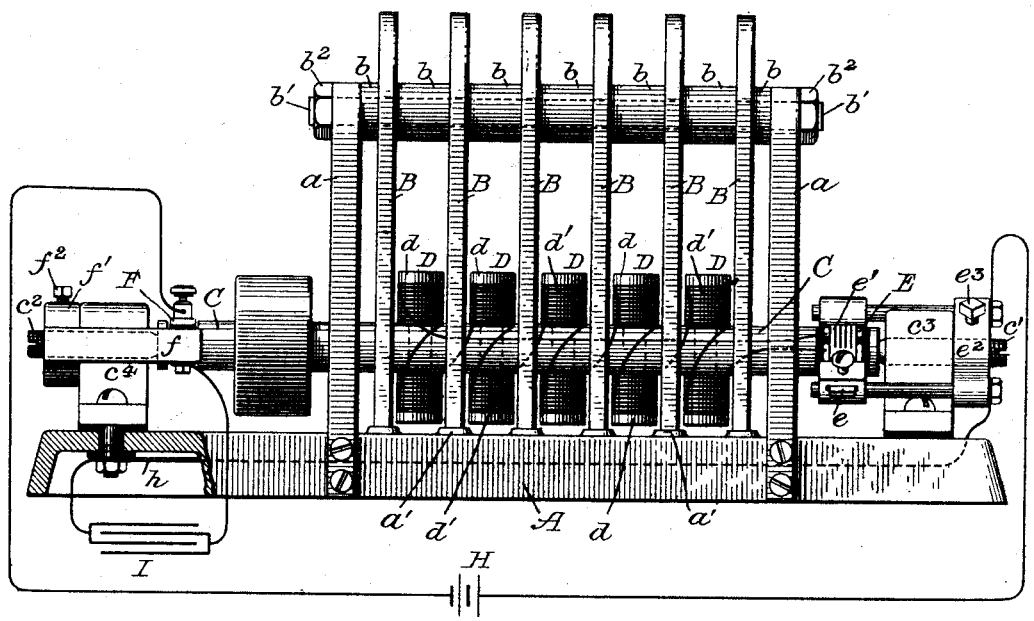
Figure 2:
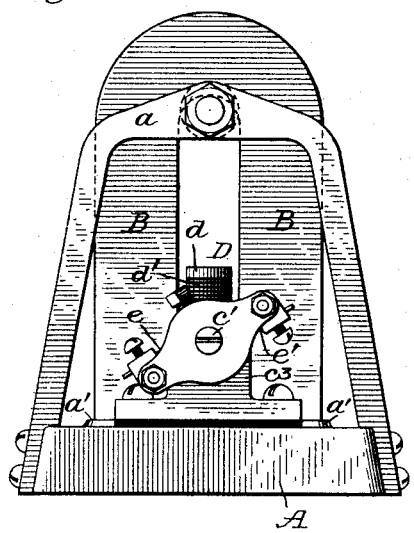
Figure 3:
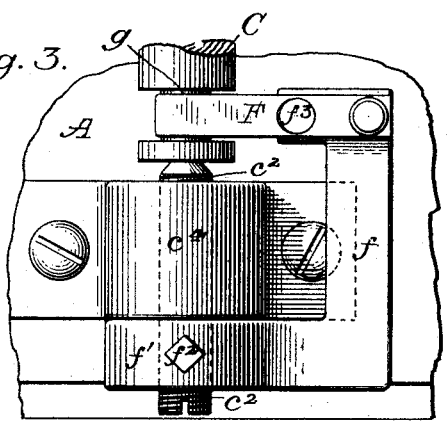
Figure 4:
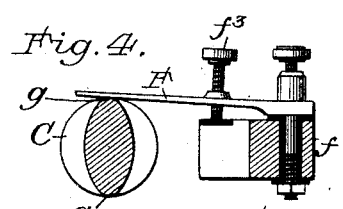

Referring to the drawings, Figure 1 illustrates a machine embodying my invention in side elevation, a portion of the base or bed-plate being broken away for disclosing a portion of the electric circuit. Fig. 2 illustrates the same in end view, and Figs. 3 and 4 are detail views of the device employed for controlling the initial or supply current.

The machine illustrated in the drawings is designed for small power and is mounted upon a suitable base A, composed of wood, brass, or other non-magnetic material, and is provided with two uprights $a\ a$, between which the field-magnets are mounted. The field-magnets B, which in the machine shown are six in number, are permanent horseshoe-magnets, having their poles resting upon the base A and confined against displacement by cleats or bosses $a'$, as clearly shown. These magnets B are arranged parallel to each other at predetermined distances apart and are clamped at their upper ends between spacing blocks or sleeves $b$, carried upon a rod $b'$, which passes beneath the bends of the magnets through the uprights $a\ a$ and clamped by nuts $b^2\ b^2$, as clearly shown. As thus mounted no holes are drilled through the magnets, and the weakening which would be occasioned thereby is avoided.

The armature-shaft C is composed of brass or other non-magnetic metal and is mounted between the poles of the field-magnets and is supported by and revolves upon conical bearings afforded by the ends of two set-screws $c'$ $c^2$, mounted in pillow-blocks $c^3\ c^4$ at the ends of the shaft. The armature-magnets D project from diametrically opposite sides of the shaft C at right angles thereto and at such distances apart as to occupy the spaces between the field-magnets B. The cores of the electromagnets D are composed of soft-iron bars, which are driven through holes drilled through the shaft C, the ends of the several cores projecting from diametrically opposite sides of the shaft and all in the same plane. The ends of the cores are provided with cap-pieces $d$, which are riveted on and form the exposed or active portion of the magnets. The windings $d'$ of the armature-magnets are all in the same direction, or technically, in series, the terminals being connected with the two-part commutator E, having brushes $e\ e'$, so that current may pass in by way of one of the brushes to and through the coils of each electromagnet in succession and out by way of the other commutator-brush, as will be readily understood.

The commutator-brushes are mounted upon a yoke $e^2$, supported by the outer end of the shaft-supporting screw $c'$ and rotatively adjustable thereon for varying the adjustment of the commutator-brushes, and having a set-screw $e^3$ for securing it in its proper position of adjustment, as clearly shown.

At the opposite end of the armature-shaft is a novel make-and-break device controlled by the revolution of the shaft, the object of the device being to break the initial or supply current when the armature is in such a position that it would not be effective and admit it only when the magnets of the armature are in position to exert their most effective pull on the poles of the field. The current generated at break is controlled by a condenser and added to the initial current on the next completion or making of the circuit, thus considerably increasing the effectiveness of the machine.

The make-and-break device (shown in Fig. 1 and in detail in Figs. 3 and 4) consists of a contact spring or brush F, which engages with contact-points $g\ g$ on the armature-shaft C. The spring F is secured to an arm $f$, projecting from a rotatively-adjustable sleeve $f'$, mounted upon the outer end of the shaft-supporting screw $c^2$ and provided with a set-screw $f^2$, so that the spring F may be rotatively adjusted with reference to the armature-shaft and secured in its proper position of adjustment in the same manner as the commutator-brushes before described. The contacts $g\ g$ are formed by cutting away a portion of the armature-shaft at two sides thereof, so as to form a portion which is elliptical in cross-section, the periphery at the longest diameter of the ellipse forming the contacts, as best illustrated in Fig. 4; but it is to be understood that these contacts may be raised portions of the shaft or they may be formed after the manner of a two-part commutator, in which latter case the spring F would alternately engage with an electrical contact and an insulating-plate, as will be readily understood.

The spring F is provided with an adjusting-screw $f^3$ for regulating the pressure and duration of contact on the shaft, as clearly shown.

A battery is indicated in the drawings at H. The different parts of the machine are of course properly insulated where this is necessary, and when proper connections have been made current enters by way of the spring or contact-brush F, through armature-shaft C, (at such times as it may be in contact with said spring,) to shaft-supporting screw $c^2$, through pillow-block $c^4$, through wire $h$, (under the base A,) which connects with commutator-brush $e$, thence through the several armature-windings D, and out by way of commutator-brush $e'$ to the other pole of the battery H.

The condenser I may be of any approved construction and is introduced into the circuit to prevent sparking at the brushes and to store and utilize the current induced at the breaking of the circuit. The terminals of the condenser are coupled, respectively, to the pillow-block $c^4$ and spring F, as clearly shown in Fig. 1.

The current is broken twice during each revolution of the armature by the make-and-break device at the end of the armature-shaft. This make-and-break device is arranged to admit current only at such times as the armature is in position to exert its most effective pull on the poles of the field and to break the same when the armature has passed said position, the current remaining broken until the armature again reaches a position where it begins to exert its greatest power. The extra or induced current generated at break passes along wire $h'$ to condenser I, where it is stored and added to the initial or supply current at the next completion or making of the circuit.

The armature of this machine is in reality a collection of small armatures which will become magnetized and demagnetized with great rapidity, and the current flowing from one is utilized in all, and while but six field-magnets and five armature-magnets are shown it is obvious that the number may be increased or decreased without departure from my invention.

Having thus described my invention, what I claim as new, and desire to secure by Letters Patent, is—

1. In a magneto-electric motor-dynamo, a field composed of a series of permanent magnets suitably arranged and supported at substantially equal distances apart, and an armature comprising a shaft and a series of electromagnets extending at right angles from diametrically opposite sides thereof in the same longitudinal plane and arranged to alternate with the permanent or field magnets, substantially as described.

2. In a magneto-electric motor-dynamo, the combination of a field composed of a series of permanent magnets suitably arranged and supported at substantially equal distances apart, and an armature comprising a shaft of non-magnetic material and a series of electromagnets arranged upon said shaft with their cores extending at right angles from diametrically opposite sides thereof in the same longitudinal plane and arranged to alternate with the permanent or field magnets, substantially as described.

3. In a magneto-electric motor-dynamo, the combination with a field composed of a series of permanent magnets suitably arranged and supported at substantially equal distances apart, of an armature comprising a shaft of non-magnetic material and a series of electromagnets, the cores of which pass through and extend from diametrically opposite sides of said shaft and lie in the same longitudinal plane, the said electromagnets being arranged to alternate with the field or permanent magnets, substantially as described.

4. In a magneto-electric motor-dynamo, a base or support, uprights or standards secured to said base, a series of permanent magnets arranged upon said base between said standards, a series of sleeves or spacing-blocks interposed between said permanent magnets, a bolt passing through and out of contact with said permanent magnets, and clamping-nuts applied to said bolt and engaging the uprights or standards, combined with an armature having its magnets alternating with said permanent magnets, substantially as described.

5. In a magneto-electric motor-dynamo, a base or support having uprights or standards secured thereto, a series of permanent magnets arranged upon said base between said standards, a series of sleeves or spacing-blocks interposed between said permanent magnets, a bolt passing through and out of contact with said magnets, clamping-nuts applied to said bolt and engaging the uprights or standards, and cleats or stops secured to the base and engaging the poles of said magnets to prevent displacement thereof, combined with an armature having its magnets alternating with said permanent magnets, substantially as described.

6. In a magneto-electric motor-dynamo, the combination of a field, an armature and its shaft, a commutator, a condenser, and a make-and-break device within the condenser-circuit controlled by the revolution of the armature-shaft for making and breaking the current supplied to the armature, substantially as and for the purposes described.

7. In a magneto-electric motor-dynamo, the combination of a field, an armature and its shaft, a commutator, a condenser, and a make-and-break device within the condenser-circuit consisting of electrical contacts upon the armature-shaft and a brush or spring adapted to engage and disengage said contacts during the revolution of the shaft for making and breaking the current supplied to the armature, substantially as and for the purposes described.

8. In a magneto-electric motor-dynamo, a field compossed of a series of permanent magnets suitably arranged and supported upon a base at substantially equal distances apart, an armature comprising a shaft and a series of electromagnets extending at right angles from diametrically opposite sides thereof and all arranged in the same longitudinal plane and alternating with the permanent field-magnets, a two-part commutator at one end of the shaft of the armature and connected in circuit with the magnets of the armature, and a make-and-break at the other end of said shaft to control the initial current to said armature, substantially as described.

9. In a magneto-electric motor-dynamo, a field composed of a series of permanent magnets suitably arranged and supported upon a base at substantially equal distances apart, an armature comprising a shaft and a series of electromagnets extending at right angles from diametrically opposite sides thereof and all arranged in the same longitudinal plane and alternating with the permanent or field magnets, a two-part commutator at one end of the shaft of the armature and connected in circuit with the magnets of said armature, a make-and-break at the other end of said shaft to control the initial current to said armature, and a condenser included in the circuit and adapted to prevent sparking and to store the induced current and supply such stored current to the initial current to add to its effectiveness, substantially as described.

10. In a magneto-electric motor-dynamo, the combination of a field, an armature and its shaft, a commutator, a make-and-break device controlled by the revolution of the armature-shaft, and a condenser for controlling the induced current, substantially as and for the purposes described.

In testimony whereof I have hereunto set my hand in presence of two subscribing witnesses.

FRED H. DONALDSON.

Witnesses:
HENRY E. NEWTON,
ALICE J. STEVENS.